(12) United States Patent
Kern et al.

(10) Patent No.: US 6,206,385 B1
(45) Date of Patent: Mar. 27, 2001

(54) MODULAR UNIVERSAL FLAT BED CART WITH VARIABLE SUPPORT AND MANEUVERING HANDLES

(75) Inventors: Alan R. Kern; Scottlan R. Henry, both of Richmond; Brad R. Schwichtenberg, Midlothian; Terrill M. Porter, Glen Allen, all of VA (US)

(73) Assignee: Rehrig International, Inc., Richmond, VA (US)

( * ) Notice: Subject to any disclaimer, the term of this patent is extended or adjusted under 35 U.S.C. 154(b) by 0 days.

(21) Appl. No.: 09/005,040

(22) Filed: Jan. 9, 1998

Related U.S. Application Data (63) Continuation-in-part of application No. 08/771,685, filed on Dec. 23, 1996, now abandoned.

(51) Int. Cl.$^7$ ............................................. B62B 3/02

(52) U.S. Cl. ................................ 280/47.35; 280/79.3

(58) Field of Search .................. 280/33.996, 33.998, 280/47.34, 47.35, 47.36, 47.371, 79.11, 79.2, 79.3, 79.7; 188/19; 211/189, 191, 204; 403/373, 378

(56) References Cited

U.S. PATENT DOCUMENTS

| | | |
|---|---|---|
| 155,847 | 10/1874 | Zimmerman . |
| D. 162,230 | 2/1951 | Sasser . |
| 1,239,498 | 9/1917 | Madigan . |
| 1,247,822 * | 11/1917 | Gregg ................................ 280/79.11 |
| 1,563,057 * | 11/1925 | Williams ............................. 280/79.3 |
| 1,991,397 * | 2/1935 | Lampman ........................... 280/79.3 |
| 2,070,095 | 2/1937 | Shepard, Jr. et al. ............. 280/47.16 |
| 2,712,452 * | 7/1955 | Hallowell et al. ................. 280/79.11 |
| 2,833,550 | 5/1958 | Prick . |
| 3,102,648 | 9/1963 | Hughes . |
| 3,137,250 * | 6/1964 | Hutchinson ....................... 280/47.34 |
| 3,689,098 | 9/1972 | Rubin ............................... 280/33.998 |
| 3,744,812 | 7/1973 | Langhausen . |
| 3,762,739 | 10/1973 | Tabet ................................ 280/47.371 |
| 3,887,207 | 6/1975 | Gotsch, Jr. ....................... 280/33.998 |
| 4,018,449 * | 4/1977 | Anderson ............................... 188/19 |
| 4,077,644 | 3/1978 | Roby et al. ......................... 280/47.34 |
| 4,165,088 * | 8/1979 | Nelson ............................... 280/47.35 |
| 4,169,607 | 10/1979 | Reese . |
| 4,349,213 * | 9/1982 | Hirsch .............................. 280/47.35 |
| 4,458,906 | 7/1984 | Lamson ............................. 280/47.34 |

(List continued on next page.)

FOREIGN PATENT DOCUMENTS

| | | | |
|---|---|---|---|
| 2343424 * | 3/1975 | (DE) | ................................. 280/79.11 |
| 3604657 * | 8/1987 | (DE) | ................................... 280/79.3 |
| 0 487 147 A1 | 5/1992 | (EP) . | |
| 1422668 | 11/1965 | (FR) . | |
| 2596718 * | 10/1987 | (FR) | ................................. 280/47.35 |
| 936390 | 9/1963 | (GB) . | |
| 1405602 | 9/1975 | (GB) . | |
| 2043549 * | 10/1980 | (GB) | ................................. 280/79.11 |
| 6-1353 | 1/1994 | (JP) . | |

OTHER PUBLICATIONS

Sales Brochure. D.I.Y. Transport Trolley, Code No. 05.09 776.73 (undated).

Primary Examiner—Frank Vanaman
(74) Attorney, Agent, or Firm—Bacon & Thomas, PLLC (57) ABSTRACT

A modular, universal, molded plastic flatbed type cart for carrying and supporting products includes variable product supporting metallic handles located at opposed ends of the cart. The handles include vertically extending posts that define at least one central channel completely open in an upward direction above the bed section of the cart and preferably another upwardly opening side channel located above the cart bed; continuous U-shaped handles, handles with a collapsible tray, and connector rails spanning the handles from one end of the cart to the other. The product handles are usable for manipulating the cart and are integrated into metal cart bed reinforcing elements.

7 Claims, 8 Drawing Sheets

U.S. PATENT DOCUMENTS

| | | | |
|---|---|---|---|
| 4,512,591 | * 4/1985 | Plante | 280/47.35 |
| 4,749,209 | 6/1988 | Edmonds. | |
| 4,772,153 | * 9/1988 | Huang | 403/373 |
| 4,826,186 | * 5/1989 | Hagelin | 280/33.996 |
| 4,850,604 | * 7/1989 | Le Marchand et al. | 280/33.996 |
| 4,863,179 | 9/1989 | Isaacs | 280/33.996 |
| 5,228,716 | 7/1993 | Dahl | 280/651 |
| 5,409,245 | 4/1995 | Kern et al. | 280/33.996 |
| 5,476,282 | 12/1995 | Dahl | 280/651 |
| 5,484,150 | * 1/1996 | Yasutomi | 280/47.34 |
| 5,531,295 | * 7/1996 | Kopman et al. | 280/47.34 |

* cited by examiner

MODULAR UNIVERSAL FLAT BED CART WITH VARIABLE SUPPORT AND MANEUVERING HANDLES

CROSS REFERENCE TO RELATED APPLICATION

This application is a continuation-in-part of U.S. patent application Ser. No. 08/771,685 filed Dec. 23, 1996 now abandoned.

BACKGROUND OF THE INVENTION

1. Field of the Invention

This invention is in the field of flatbed carts for carrying and supporting elongated or wide products such as lumber, plywood and similar articles.

2. Related Art

Flatbed carts with vertically extending handles and other structures useful for manipulating the carts are generally known and can be seen in exemplary U.S. Pat. No. 5,409,245 (co-owned with this invention); U.S. Pat. Nos. 5,476,282; 4,863,179; and 3,689,098.

Such carts are versatile for carrying various products but have much to be desired with regard to carrying, storing and supporting elongated and wide products (e.g., products that are longer and/or wider than the cart bed). Carts that can be used for such purposes find great utility in do-it-yourself or self-service home improvement merchandising establishments that continue to grow in popularity and diversity.

Prior art carts utilize various handles and product support structures at the opposed end sections of the carts, but such structures are not universally usable for elongated articles such as boards or posts, angle iron stock, trim, moldings, etc., as well as wider articles such as wall board, plywood, panels, and the like, all of which are usually longer and/or wider than the cart bed. Moreover, the product support structures used in prior art carts may not permit ready manipulation of the cart when the structures are carrying long and wide products. It is also highly desirable to provide product support and manipulating handles integrated in a single sturdy design that can withstand the rigors of self-service, home improvement merchandising establishments, while still being economical to manufacture.

Prior art carts also are constructed with dedicated handle arrangements that may not be conveniently interchanged with other handle arrangements. However, because of problems associated with inventories of different flat bed carts, repair parts availability, higher costs, and so forth, users of flat bed carts are not inclined to place orders with cart manufacturers each selling carts having different handle arrangements. It is highly desirable, therefore, to provide a universal modular flat bed cart that accommodates different product support handles and maneuvering handles for the cart.

SUMMARY OF THE INVENTION

The invention is a modular, universal flatbed wheeled cart having variable product carrying and maneuvering handle arrangements, including supporting end structures located at opposed ends of the cart bed. The end structures may also function as handles for manipulating the cart, even when the end structures are carrying or supporting products extending beyond the cart ends at which the structures are located. The end structures in one embodiment each include at least two spaced apart vertical central post members that define open product support central channels extending upwardly from the cart bed to an area above the top ends of the central post members and without any interfering structure located between the post members or above the central post members.

The handle end structures in the one embodiment also preferably include a pair of laterally spaced side post members, with a single side post member spaced laterally from each one of the central post members. A generally horizontal interconnecting bar extends between a central post member and the adjacent side post member with the horizontal interconnecting bar located approximately midway along the length of the central post member. The horizontal interconnecting bar extending between a side post member and a central post member defines an upwardly extending open side channel for supporting elongated products above the bed of the cart, each side channel being defined by the horizontal interconnecting bar and the upper end sections of the central and side post members connected to and extending above the horizontal interconnecting bar.

The handle end structures are connected to the cart body so as to provide a robust structure for supporting large heavy products and to enable manipulation of loaded carts. Preferably the cart bed is formed of molded synthetic resin and includes longitudinally extending metal reinforcing members beneath and on either side area of the bed of the cart that provide rigidity to the cart bed as described in U.S. Pat. No. 5,409,245. In accordance with the preferred embodiment of the invention, the handles are metal and are connected to the reinforcing members of the cart by socket connectors in a manner to be described below.

The handles preferably are connected to a single lower horizontal post support bar that in turn spans and is rigidly connected to the ends of the reinforcing members by tubular metal connector sockets welded to the opposed ends of the reinforcing members so as to provide a strong structural arrangement of metal components integrated with the molded resin cart bed.

The handle end structures may comprise central vertical post members, laterally spaced side post members extending parallel to the central post members, interconnecting horizontal bar members between the side post members and the central post members, continuous bent metal handles, and a bent handle including a folding tray.

Generally horizontally extending rails may be provided that span the upper ends of the vertical post members located at each end of the cart bed. Also, a brake system for the cart bed may be provided with a brake actuator connected to an assembly of the vertical post handles and the horizontal reinforcing members spanning the vertical post members transversely of the cart bed.

DETAILED DESCRIPTION OF PREFERRED EMBODIMENTS OF INVENTION

Figure 1:
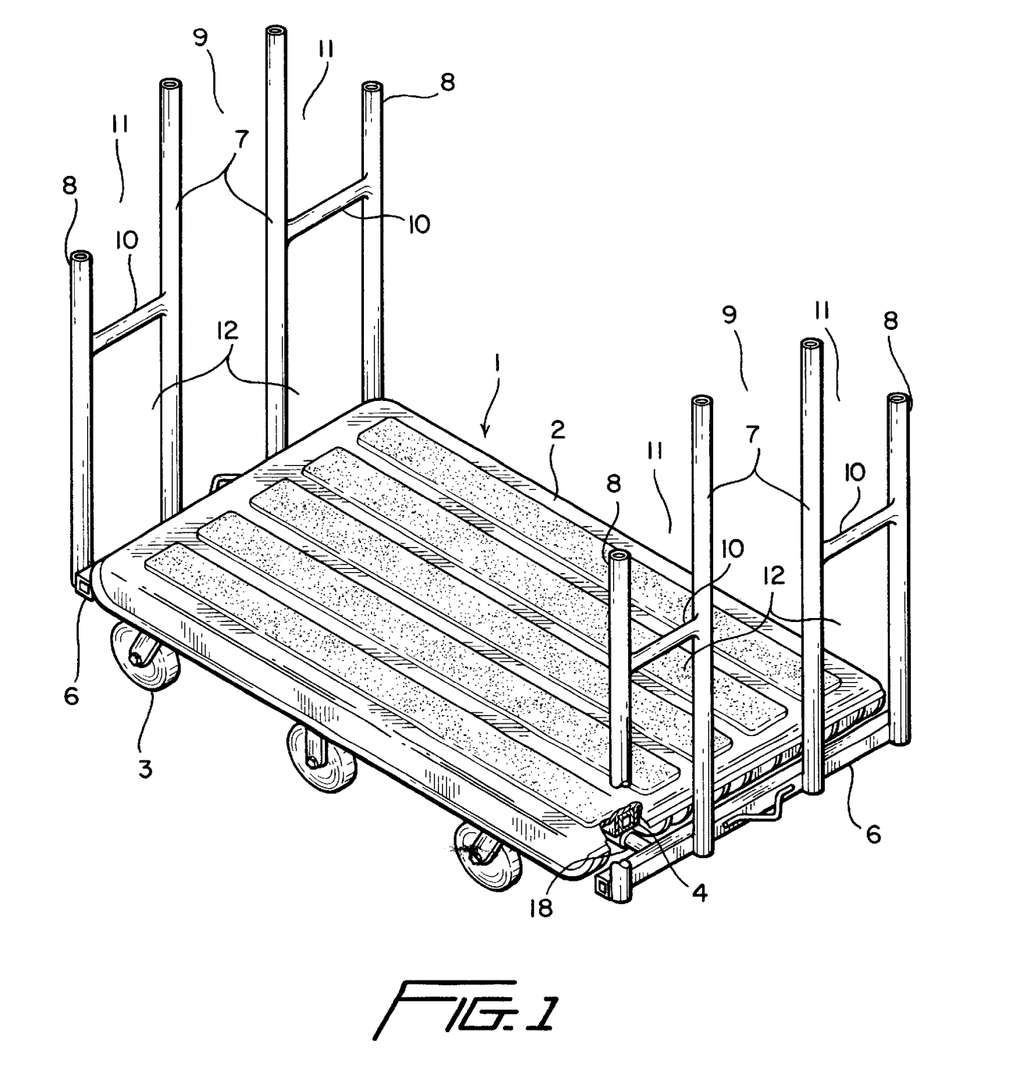
FIG. 1 is an upper perspective view of one embodiment of the invention.
Figure 2:
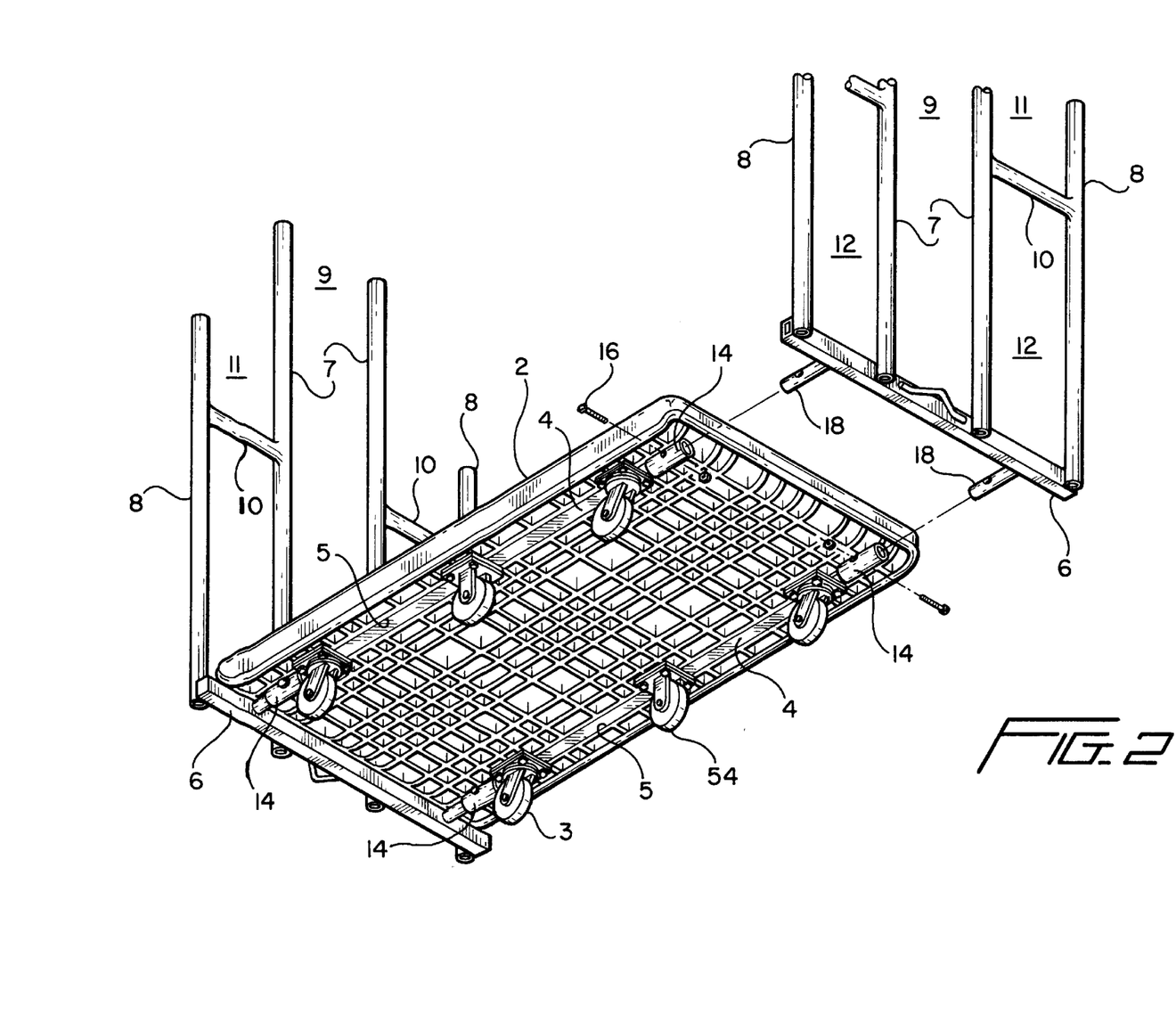
FIG. 2 is a bottom view of the embodiment of FIG. 1.

As seen in the drawings, a flatbed cart 1 embodying an example of the invention includes a cart bed 2 having a wheel set 3 of a plurality of wheels mounted to its underside as shown in FIG. 2. The bed preferably is formed of molded synthetic resin and substantially conforms with the cart bed described in U.S. Pat. No. 5,409,245, without a front bumper assembly.

The cart bed 1 includes longitudinally extending metallic reinforcing bars 4 inserted into corresponding channels 5 molded in the underside of the cart bed. The reinforcing bars 4 are retained in the channels by the bolted-on wheel set 3 or by any other appropriate fastening arrangement.

A pair of lower metal horizontal post support bars 6 are rigidly connected to the reinforcing bars 4 at opposed ends of the cart bed 2, for example by connector sockets to be described below, so as to extend generally transversely horizontally and parallel with the upper surface of the cart bed. Vertically extending parallel central post members 7 and vertical, adjacent, side post members 8 are rigidly secured to the post support bar 6 such as by welding or suitable fasteners.

The central pair of post members 7 form an open central channel 9 above each respective end of the cart bed 2 at which the posts are located. The side post members 8 are connected by horizontal interconnecting bars 10 to the central post members 7. The horizontal interconnecting bars 10 are located toward the mid-section of the central post member 7, which are longer than the side post members 8, although the bars can be located somewhat above or below the midsection of the central post members 7. However, since it is desired to provide upwardly open side channels 11 above the interconnecting bars 10 and to reinforce the central bars about mid-way along their lengths, a location for the horizontal interconnecting bars about mid-way along the heights of the central post members 7 has been found to be effective.

It will thus be seen that the cart 1 includes the bed 2 and opposed end structures at opposed ends of the bed, each end structure comprising a lower horizontal post support bar 6, central post members 7, side post members 8 and horizontal interconnecting bars 10 interconnecting the central post members 7 and 8 generally as illustrated. The open central channels 9 between central post members 7 provide unimpeded upwardly opening channels above the cart bed for receiving products that are longer than the cart bed 2 and which may be wider than the bed as well, such as wall boards and panels. The open side channels 11 between central post members 7 and side post members 8 and above horizontal interconnecting bars 10 also provide support for elongated products above the cart bed 2 at a location that is readily and conveniently usable by a cart user at a self-service product merchandiser.

In addition, side recesses 12 above the cart bed 2 and between the central post members 7 and side post members 8 below the horizontal interconnecting bars 10 also provide product supporting areas for elongated products stacked on the cart bed and inserted lengthwise through the recesses. The cart bed 2, of course, is open and unimpeded for enabling individual or stacked products to be carried on the upper side thereof.

The central post members 7 and side post members 8 provide handles for manipulating the cart along their lengths, and it will be obvious that a user can grasp the post members at any location along their vertical lengths for manipulating the cart, irrespective of the amount of product located in the channels, recesses or on the cart bed.

Figure 10:
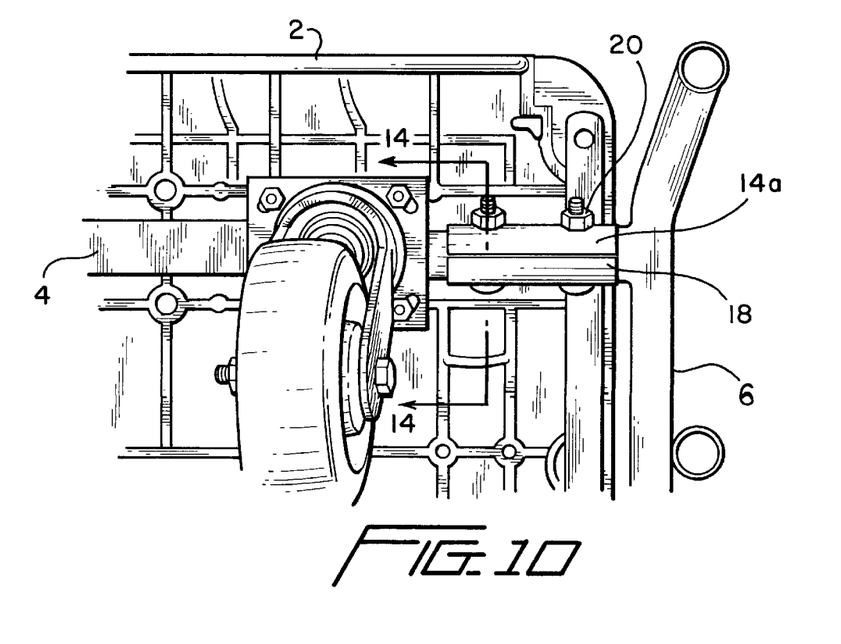
FIG. 10 is a detailed view showing a connector socket located at one end of the cart.
Figure 14:
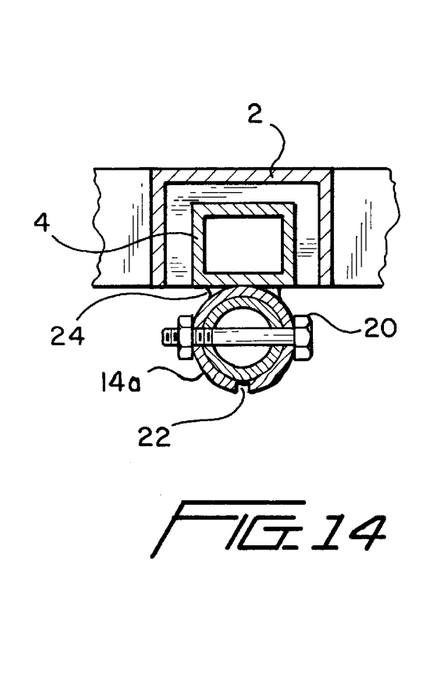
FIG. 14 is a section view taken along line 14—14 in FIG. 10.

The horizontal post support bars 6 are connected to connector sockets 14 welded or otherwise secured to the opposed ends of the reinforcing bars 4 beneath the cart bed 2 by means of bolts 16 or any other suitable fastening arrangement. The sockets 14 may be continuous tubular elements as shown in FIG. 2 or may be longitudinally split tubular socket elements 14a as shown in FIG. 10. The split tubular socket elements 14a are shown in more detail in FIG. 14 including transverse fasteners 20 that serve to compress the split tubular socket elements 14a around horizontally extending securing rods 18 (described below) to secure the handle structures at each end of the cart to the underside of the cart bed. A longitudinal split 22 is located at or adjacent the bottom of the socket elements 14a and the socket elements 14a are welded to the reinforcing bars 4 adjacent the opposed ends thereof as shown at 24. Horizontally extending securing rods 18 extend from the lower post support bars 6 for engagement with the socket elements 14a or the sockets 14. This arrangement permits interchangeability between the post support bars 6 and another handle arrangement, for example a continuous curved handle 19 of the type illustrated in U.S. Pat. No. 5,409,245. The rigid connection between the handles, post support bars 6 and the reinforcing bars 4 provides a rugged, integrated construction that enables the loads imposed on the metal handles to be ultimately transmitted to the metallic reinforcing bars 4 and not to the plastic of the cart bed 2.

Figure 3:
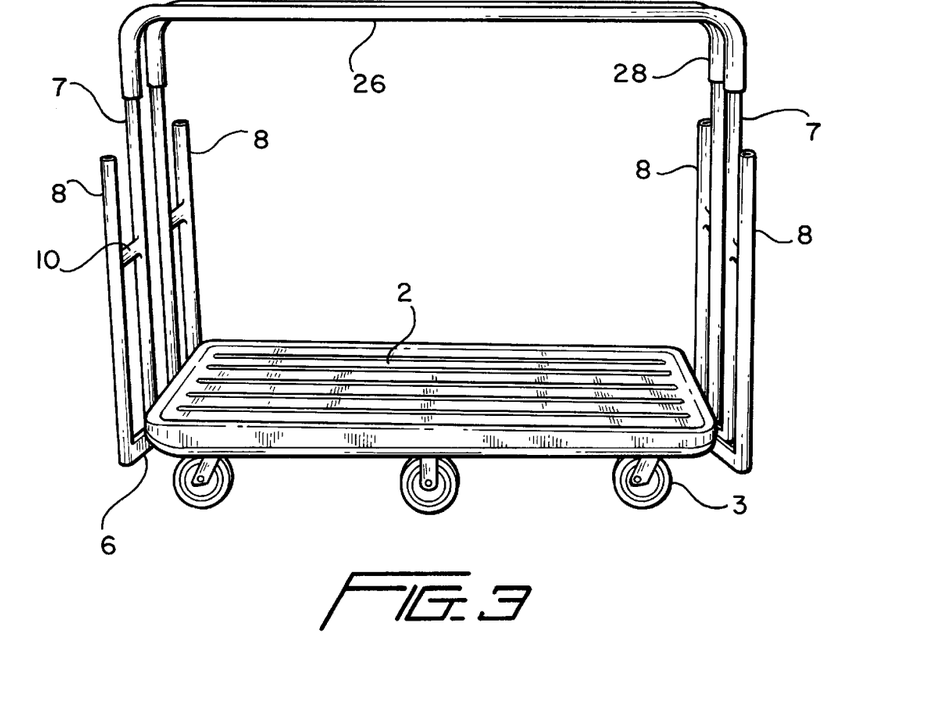
FIG. 3 is a side perspective view of the embodiment of FIG. 1 with connecting rails spanning the upper ends of the central post members of the end handles.

Connecting rails 26 spanning the upper ends of the central post members 7 may be provided with or without horizontal reinforcing rods spanning the connecting rails 26. The connecting rails 26 preferably are tubular elements having end sections 28 bent approximately 90° relative to the longitudinal axis of the rails 26, the end sections being arranged to telescopically connect the rails to the upper ends of the central post members 7, as shown in FIG. 3.

Figure 4:
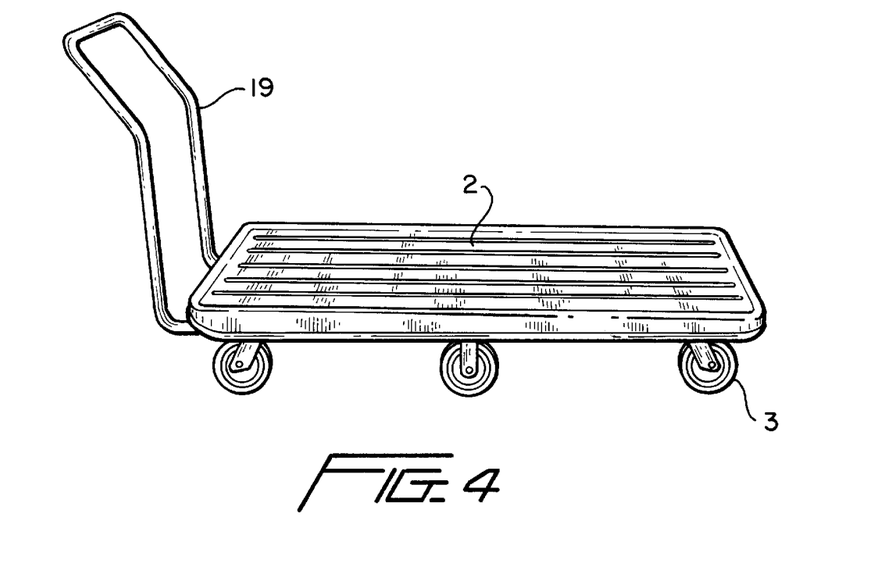
FIG. 4 is a side perspective view of another embodiment of the invention showing a continuously bent handle at one end of the flat bed cart.

FIG. 4 shows the flat bed cart 2 having a different handle end structure in the form of a continuous curved handle 19 having lower free end portions that are connected to the connector sockets 14 beneath the cart bed 2.

Figure 5:
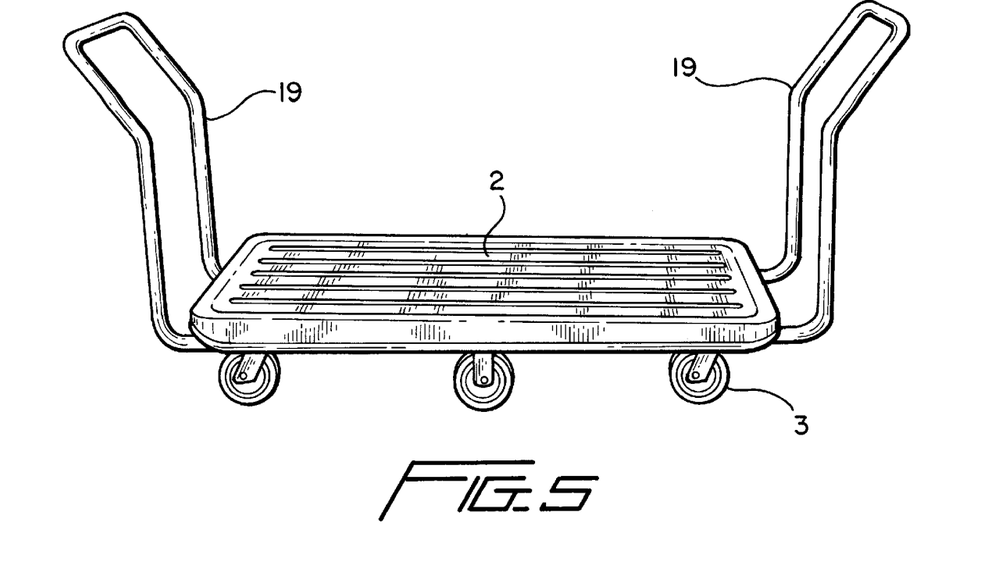
FIG. 5 is a view similar to FIG. 4 showing two continuous bent handles at opposed ends of the cart.

FIG. 5 shows a pair of curved handles 19 attached to opposed ends of the cart bed 2. This attachment is facilitated by the availability of the connector sockets 14 at opposed ends of the cart bed. Thus, one or two continuous curved handles 19 may be provided for use with the same cart bed 2.

While the curved handles 19 are described as continuous and curved, it should be understood that the upper portions of the curved handles 19 could be U-shaped tubular elements having end sections bent so that the upper portions of the U-shaped elements are bent away from the plane containing the upright portions of the handles, with the free ends of the U-shaped handles telescopically connected to the vertically extending parallel post elements forming the lower portions of the handles.

Figure 6:
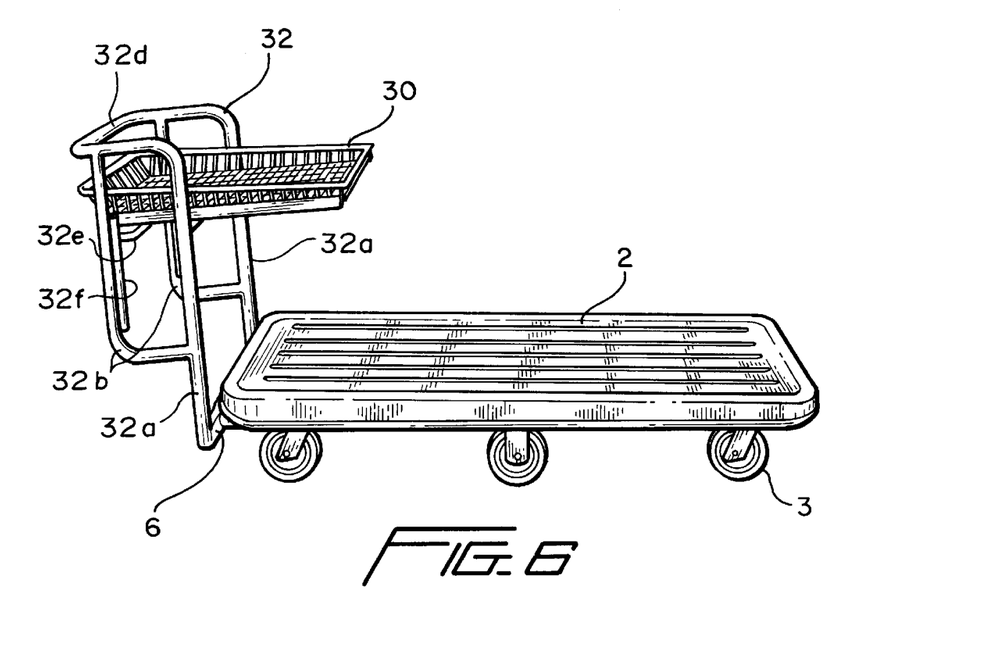
FIG. 6 is a side perspective view of a bent handle with a foldable tray at one end of the cart.

FIG. 6 illustrates still another embodiment of a handle arrangement for use with the same cart bed 2. In FIG. 6, a foldable tray 30 is mounted on a metal handle assembly 32 at one end of the cart bed 2. Of course, any other handle structure among the embodiments already described or to be described below could be provided at the opposed end of the cart bed 2.

Figure 7:
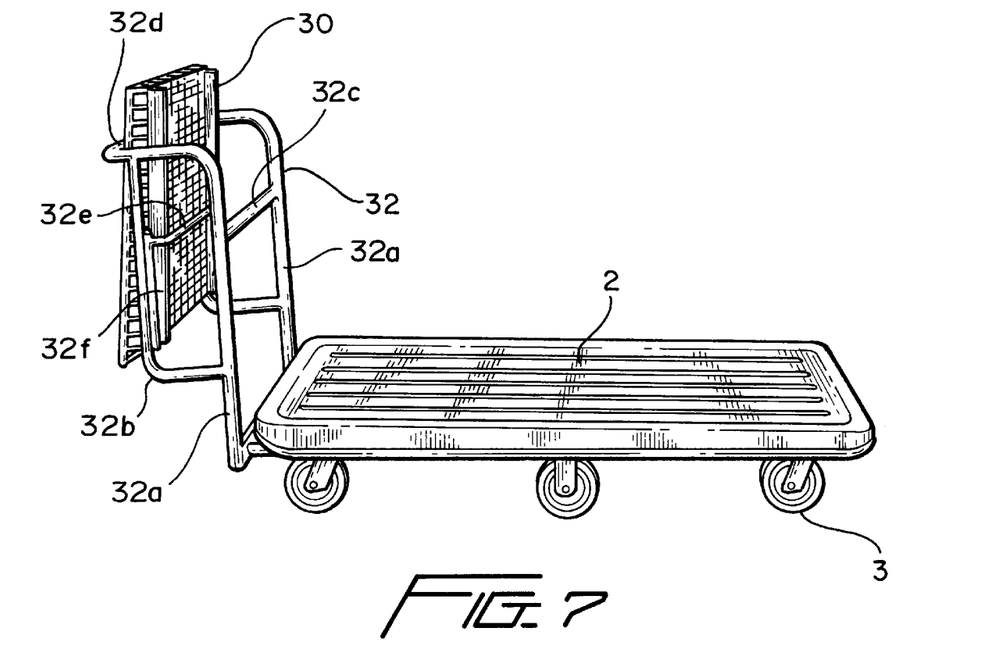
FIG. 7 is similar to FIG. 6, illustrating the tray in a folded position.

FIG. 7 shows the tray 30 in a folded condition away from the upper surface of the cart bed 2. The handle assembly 32 includes two pairs of upright posts 32a,32b, with the second pair 32b carried and supported by the first pair of posts 32a at a rearward location. Horizontal cross bars 32c, 32d and 32e transversely span the pairs of posts 32a,32b with the cross bar 32d also serving as a push handle for the cart bed 2. As illustrated, the tray moves between a horizontal product receiving position as shown in FIG. 6 and a vertical stowed position shown in FIG. 7, with the tray movement occurring between the transversely spaced pairs of posts 32a,32b.

Figure 8:
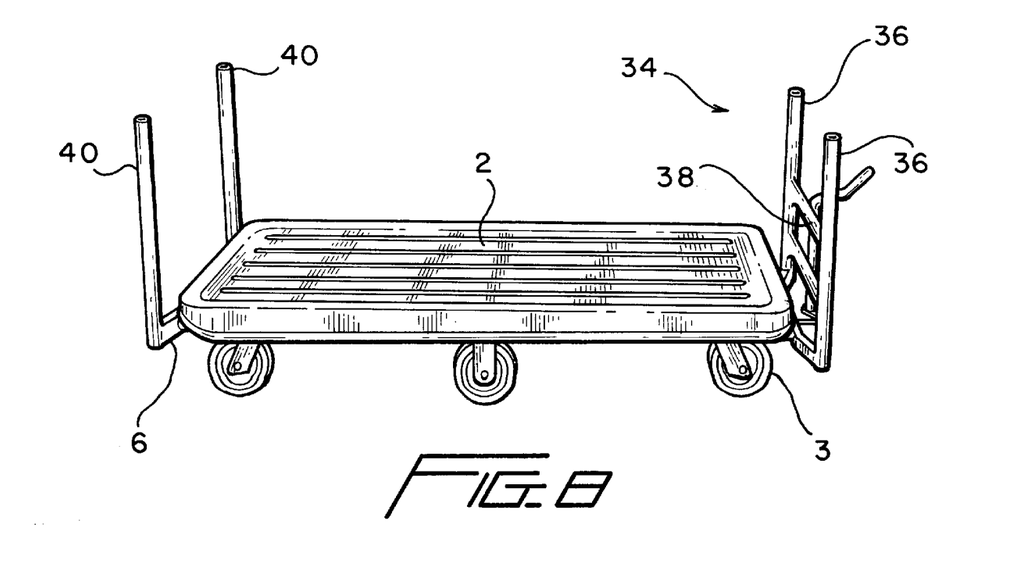
FIG. 8 is a side perspective view of the flat bed cart with another handle arrangement at opposed ends of the cart.

FIG. 8 illustrates still another handle arrangement that may be provided at the opposed ends of the cart bed 2. One such handle arrangement is illustrated at 34 which comprises a pair of vertical upright posts 36 with transversely extending reinforcing bar elements 38 spanning the vertical posts 36. A horizontal post support bar 6 spans the lower ends of the vertical posts 36 and includes horizontally extending securing rods 18 arranged to connect with connector sockets 14 or split socket elements 14a on the underside of the cart bed 2.

A pair of vertical spaced posts 40 forms another handle arrangement at the opposed end of the cart bed 2 illustrated in FIG. 8. The bottoms of the vertical posts 40 being rigidly secured to the post support bar 6 which, in turn, is connected to the connector sockets 14 or split socket elements 14a.

Figure 9:
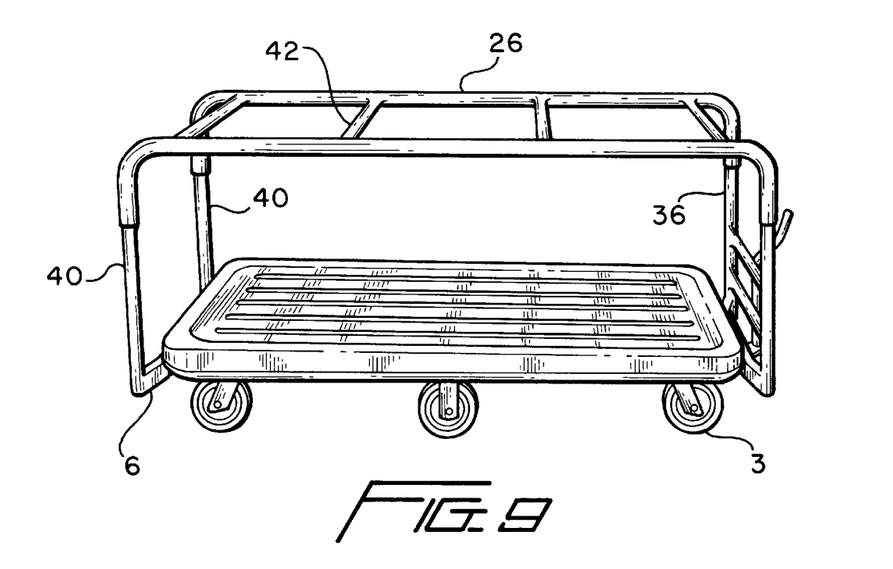
FIG. 9 is a view showing the cart of FIG. 8 with connecting rails spanning the upper ends of the vertical post handle members at each end of the cart.

Connector rails 26 spanning the upper ends of vertical upright posts 36 and vertical posts 40 are illustrated in FIG. 9 with transversely extending reinforcing bars 42 spanning the rails 26.

Figure 11:
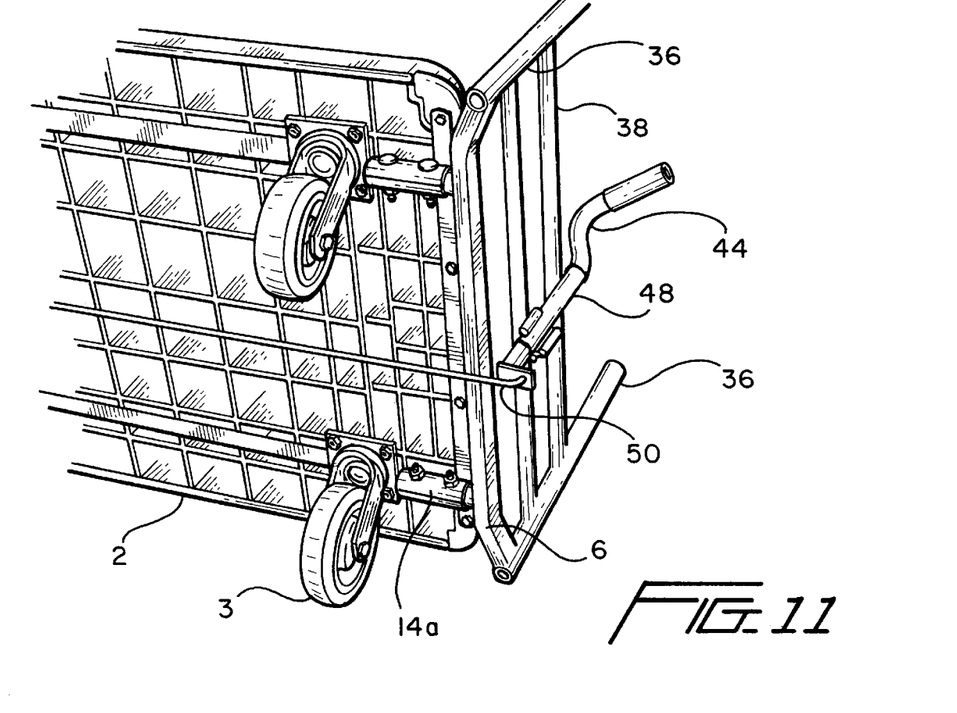
FIG. 11 is a detailed view showing a pair of connector sockets and a brake actuator assembly associated with a handle arrangement.
Figure 12:
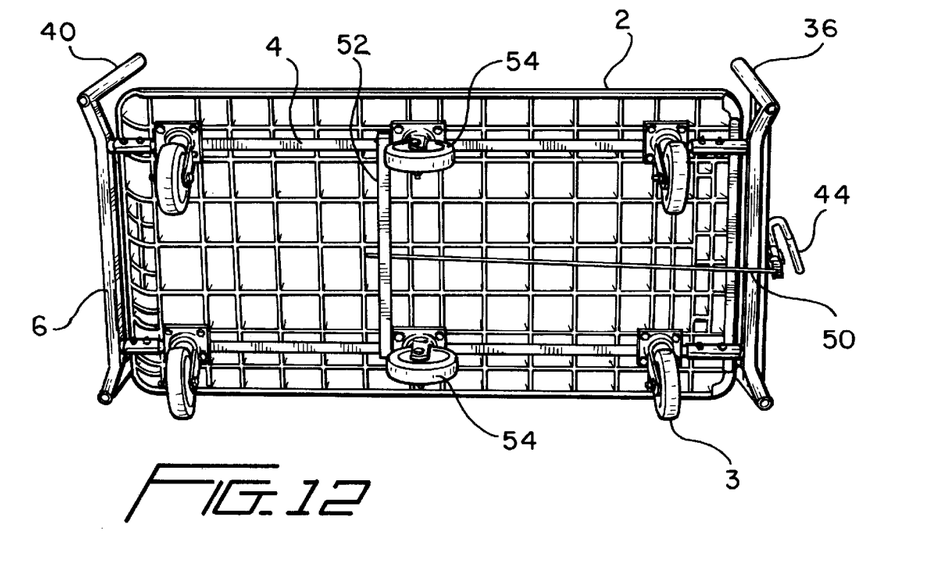
FIG. 12 is a bottom view of the cart shown in FIG. 11.
Figure 13:
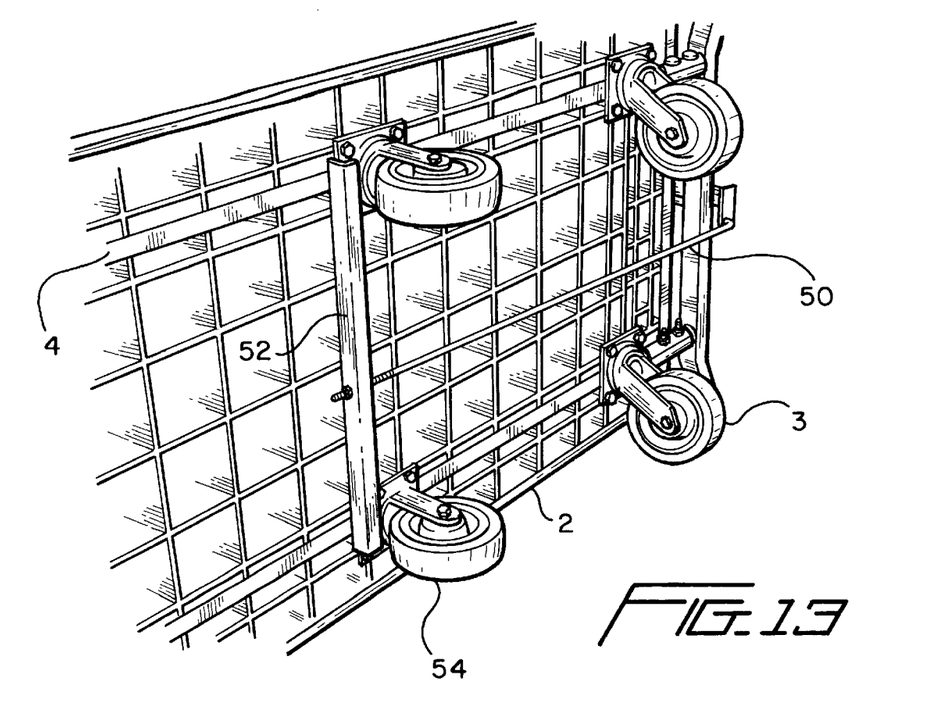
FIG. 13 is a perspective view of a brake system for a flat bed cart as shown in FIGS. 11 and 12.

As illustrated in FIGS. 11, 12 and 13, a brake actuator handle 44 may be pivotably attached to the reinforcing bar elements 38 associated with a handle arrangement located at one end of the cart bed 2. The brake actuator 44 is pivotally connected to an upright tubular bushing 48 welded or otherwise secured to the reinforcing bar elements 38 and is connected to a brake actuator rod 50 in such a manner that the brake actuator rod 50 is reciprocated upon rotation or pivotal movement of the brake actuator 44.

Figure 15:
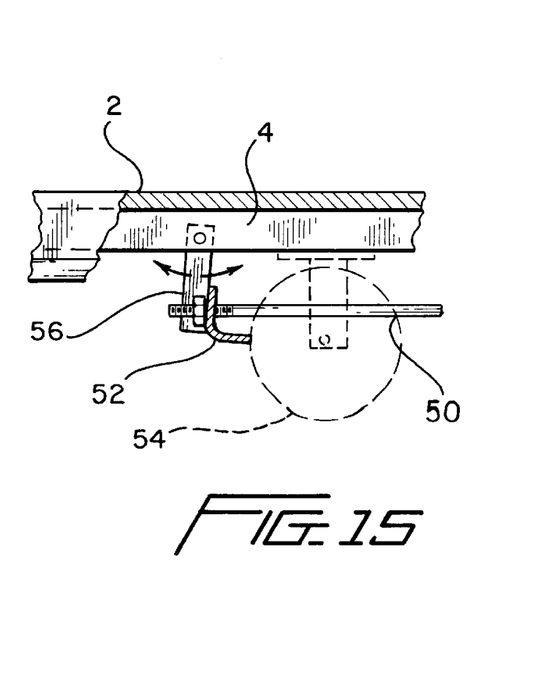
FIG. 15 shows a detail of the suspension arrangement for a brake system mounted on the cart.

Brake actuator rod 50 is connected to a brake beam 52 located centrally beneath the cart bed 2 adjacent the center wheels 54 of the wheel assembly 3. The manner in which the brake beam 52 is attached to the underside of the cart bed 2 is illustrated in FIG. 15. Specifically, reinforcing brackets 56 are pivotally connected to reinforcing bars 4 and brake beam 52 is rigidly connected to the lower ends of the brackets 56. Thus, reciprocating longitudinal movement of the brake actuator rod 50 causes the brake beam 52 to pivot towards and away from the center wheels 54 between a position whereat the brake beam 52 engages the center wheels 54 in a position whereat the brake beam does not engage the center wheels. The brake actuator 44, of course, may be secured in a position whereat the brake beam 52 engages the center wheels 54 so that a parking brake arrangement is provided for the cart bed 2.

It will thus be seen that a modular structure is provided for the cart bed 2 which enables the cart bed 2 to function in a "universal" manner with interchangeable handles and connecting rails connectable to the same socket connectors located on the underside of the cart bed 2 at its opposed ends and integrated with the metallic reinforcing bars extending longitudinally along the underside of the molded plastic cart bed 2.

Various modifications may be made to the exemplary preferred embodiments of the invention without substantially changing the nature of the invention, which is defined in the claims below.

What is claimed is:

1. A cart comprising:
   an essentially flat bed section having upper and lower sides and opposed end sections;
   a wheel set attached to said lower side of said bed section;
   handle structures at said opposed end sections of said flat bed section, each handle structure comprising:
      a pair of vertically extending laterally spaced parallel central post members having upper and lower ends and defining an upwardly open central channel extending from above said upper side of said bed section to said upper ends of said central post members;
      a pair of vertical side post members having upper and lower ends, said side post members located at opposite lateral sides of said central post members and extending parallel to said central post members;
      a generally horizontally and laterally extending lower post support bar rigidly connected to said lower ends of said central and side post members and to said bed section;
      at least one horizontal interconnecting bar extending between and rigidly connected to each central post member and an adjacent side post member at a vertical location approximately mid-length of said central post member and below said upper end of the respective side post member, to thereby define an upwardly open side channel between each side post member and central post member above said upper side of said bed section.

2. A cart according to claim 1, including at least one longitudinally extending reinforcing bar located on and connected to said lower side of said bed section;
   said lower post support bar rigidly secured to said reinforcing bar.

3. A cart according to claim 1, wherein said central post members are longer than said side post members.

4. A cart according to claim 2, wherein said at least one longitudinally extending reinforcing bar comprises two parallel such reinforcing bars, said reinforcing bars being connected to said lower side of said flat bed section and said lower post support bar being rigidly connected to both said reinforcing bars.

5. A cart according to claim 1, including at least one generally horizontal connecting rail spanning said upper ends of at least two of said central post members from one end of said bed section to the other.

6. A cart according to claim 5, wherein said at least one generally horizontal connecting rail comprises a pair of generally horizontal connecting rails spanning said upper ends of said central post members from one end of said bed section to the other.

7. A cart according to claim 6, wherein said rails comprise tubular members having end sections bent approximately 90°, said end sections telescopically connected to said upper ends of said central posts.

* * * * *